No. 722,993. PATENTED MAR. 17, 1903.
J. B. KIMBELL.
TIRE SET.
APPLICATION FILED APR. 15, 1902.
NO MODEL. 2 SHEETS—SHEET 1.

WITNESSES:
Charles F. Wilcox
Isaac B. Owens

INVENTOR
John B. Kimbell
BY
ATTORNEYS.

No. 722,993. PATENTED MAR. 17, 1903.
J. B. KIMBELL.
TIRE SET.
APPLICATION FILED APR. 15, 1902.
NO MODEL. 2 SHEETS—SHEET 2.
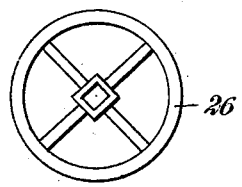
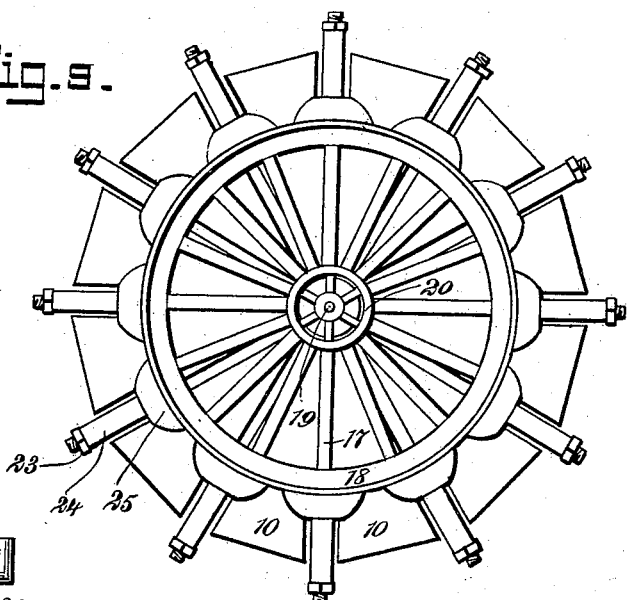
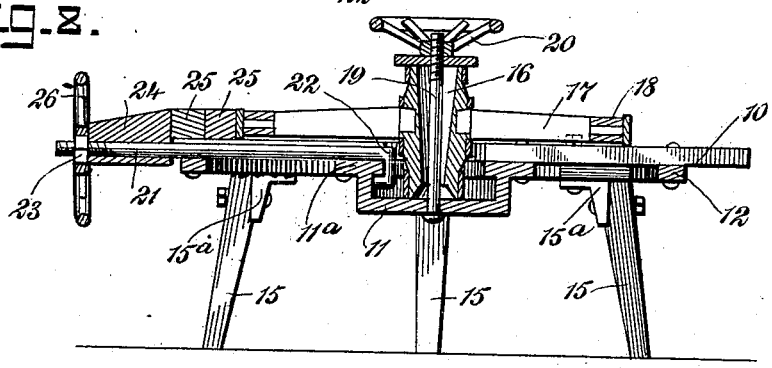
WITNESSES:
Charles F. Wilcox
Isaac B. Owens
INVENTOR
John B. Kimbell
BY
ATTORNEYS

UNITED STATES PATENT OFFICE.

JOHN BRITON KIMBELL, OF ALPHARETTA, GEORGIA.

TIRE-SET.

SPECIFICATION forming part of Letters Patent No. 722,993, dated March 17, 1903.

Application filed April 15, 1902. Serial No. 102,971. (No model.)

*To all whom it may concern:*

Be it known that I, JOHN BRITON KIMBELL, a citizen of the United States, and a resident of Alpharetta, in the county of Milton and State of Georgia, have invented a new and Improved Tire-Set, of which the following is a full, clear, and exact description.

This invention relates to an apparatus for shrinking or compressing tires when cold upon vehicle-wheels, so as to cause them to tightly fit the same.

This specification is an exact description of one example of my invention, while the claims define the actual scope thereof.

Reference is to be had to the accompanying drawings, forming a part of this specification, in which similar characters of reference indicate corresponding parts in all the views.

Figure 1:
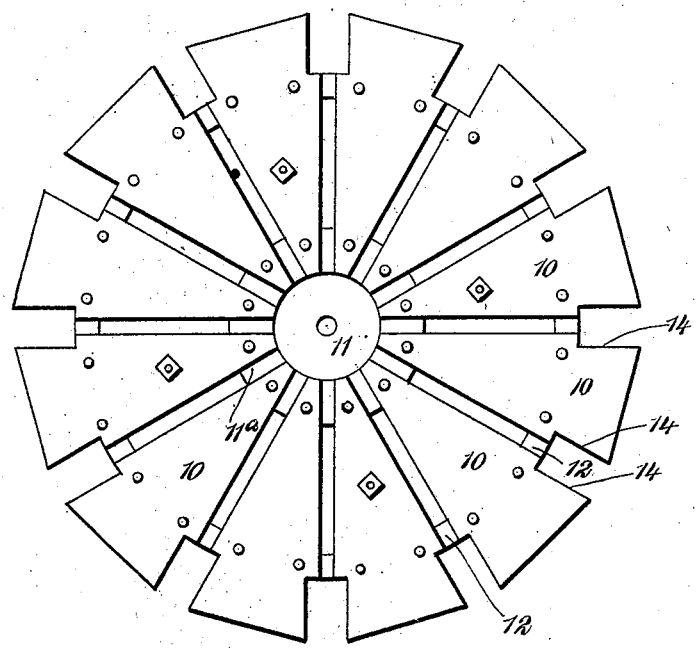
Figure 2:
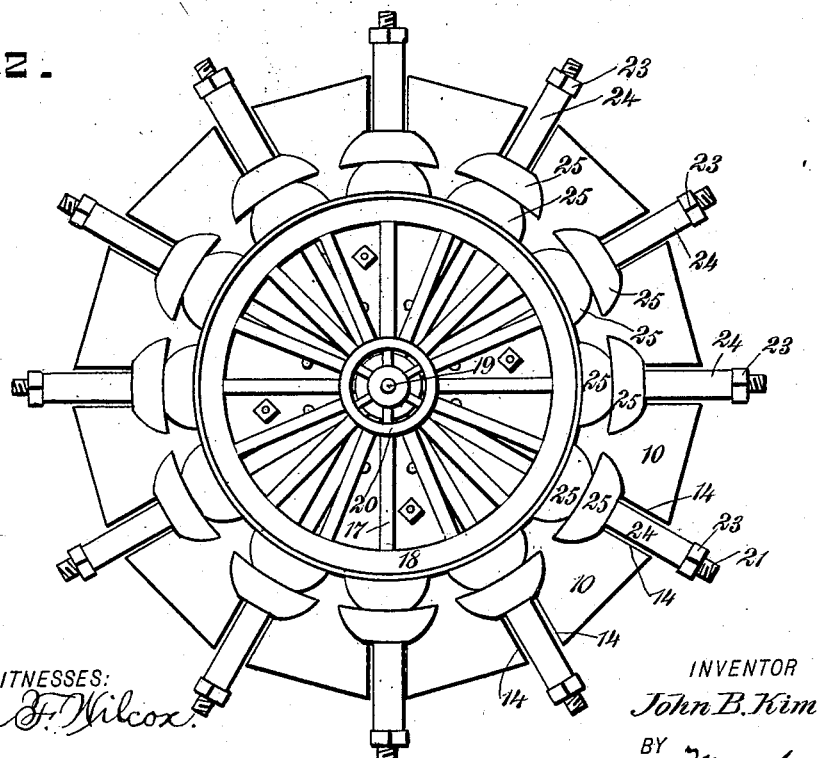

Figure 1 is a plan view of the table. Fig. 2 is a view showing the wheel placed on the table and the shrinking-blocks in place. Fig. 3 is a view of the hand-wrench. Fig. 4 is a view showing one of the compressor-rods. Fig. 5 is a view showing one of the shrinking-blocks. Fig. 6 is a perspective view of one of the blocks used with the compressor-rods. Fig. 7 is a view of one of the compressor-rods with its nut in place. Fig. 8 is a vertical section of the parts as shown in Fig. 2, and Fig. 9 is a view showing the apparatus used on a wheel the diameter of which is greater than that shown in Fig. 2.

The apparatus comprises a table which is adapted to lie horizontally and is built up of any suitable number of tapering sections 10, separated from each other by radial spaces and arranged in general circular form. These sections 10 are fastened rigidly at their inner ends to a hub-like member or disk 11, which has horizontal flanges 11ª, to which the sections 10 are bolted. Near their outer portions the sections 10 are rigidly connected on their under sides with a ring or annulus 12. At each side edge of the sections 10, adjacent to their outer ends, notches 14 are formed, these notches being opposite each other in pairs and forming radial spaces respectively in line with the spaces between the major portions of said sections.

15 indicates legs by which the table is supported in the horizontal position explained, and 15ª indicates knees and fastening devices for engaging the legs rigidly with the table.

As shown best in Fig. 8, the wheel is placed on the table with its hub 16 in the cup or hub-like member 11, the spokes 17 and felly 18 lying over the top of the table formed by the sections 10. The hub 16 is held securely and rigidly in place by a rod 19, which is passed through the cup or hub-like section and through the hub 16 and provided at its lower end with a head and at its upper end with a nut and hand-wheel 20 for tightening it in place. This holds the hub 16 rigidly in a central position and keeps the spokes and felly of the wheel pressed down on top of the table.

Lying in the radial spaces between the sections 10 of the table are the compressor-rods 21, which may be of any suitable number and which have hooks 22 at their inner ends, these hooks engaging with the inner edges of the horizontal flanges 11ª of the hub-like portion or cup 11 of the table. At their outer ends the compressor-rods 21 are provided with nuts 23, and these nuts bear on compressor-blocks 24, any suitable number of which may be employed and which are slidably fitted on the respective rods 21 and which are arranged to slide in the radial spaces formed by the opposing recesses 14. In case of small wheels—for example, the front wheels of vehicles—two or more spacing compressor-blocks 25 are employed, as shown in Fig. 2, these blocks serving to transmit the pressure of the compressing-blocks 24 to the tire of the wheel. Fig. 9, however, shows the invention in use in connection with a relatively large wheel, in which only one series of spacing compressor-blocks 25 is employed. This, of course, does not concern the essential portions of my invention, but depends merely upon the size of the wheel which is being worked.

In using the invention the wheel is placed on the table, as explained, and the spacer-blocks 25 are properly disposed so that the pressure of the blocks 24 will be communicated to the tire of the wheel. The nuts 23 are then tightened by means of any suitable device—for example, by means of the wheel-wrench 26. (Shown in Fig. 3.) This causes the blocks 24 to be forced up firmly to the wheel, and through the movement of the spacer-blocks 25 the tire is shrunk or compressed, and thus fitted tightly on the felly of the wheel.

Various changes in the form and details of my invention may be resorted to at will without departing from the spirit thereof. Hence I consider myself entitled to all forms of the invention as may lie within the intent of my claims.

Having thus described my invention, I claim as new and desire to secure by Letters Patent—

1. A tire-set, comprising a table having a centrally-located hub-like member or dish, formed with an inwardly-projecting flange, compressor-rods, each having at one end a hook to engage said flange, means at the outer end of each compressor-rod to apply pressure to the tire, and a means for holding the hub of the wheel in said hub-like member or dish.

2. A tire-set, comprising a table formed of tapering sections separated from each other to form radial spaces, a centrally-disposed hub-like member or dish fastened to the inner ends of said tapering sections and having an inwardly-projecting flange, means connected to the outer ends to hold them rigid, compressor-rods having hooks engaged with the flange of the hub-like member or dish and extending outward through said radial spaces, means at the outer ends of the compressor-rods for applying pressure to the tire, and means in the hub-like member or dish for holding the hub of the wheel therein.

3. A tire-set comprising a table having radial spaces therein and a centrally-disposed hub-like member or dish, the latter having an inwardly-projecting flange, compressor-rods having hooks connected with said flange of the hub-like member or dish and extending outward through said radial spaces, means on the outer ends of the compressor-rods for applying pressure to the tire, and means at the hub-like member or dish for holding the hub of the wheel therein.

4. A tire-set, comprising a table formed of a number of tapering sections separated from each other to form radial spaces, a centrally-disposed hub-like member or dish fastened to the inner ends of the said tapering sections, an annulus fastened to the outer portions of the sections to hold them rigid, said hub-like member having an inwardly-extending annular flange, compressor-rods having hooks engaged with said flange, the compressor-rods extending outward through said radial spaces, means at the outer ends of the said compressor-rods for applying pressure to the tire, and means at the said hub-like members or dish for holding the hub therein.

5. A tire-set, comprising a table having a number of radial spaces therein, and a centrally-disposed dish or hub member opening at its upper side and extending below the plane of the table, compressor-rods lying in said radial spaces of the table and having their inner ends engaged with the upper portion of the said dish, means at the outer ends of the compressor-rods for applying pressure to the tire, and means at the said dish or hub member for holding the hub down firmly in the same.

In testimony whereof I have signed my name to this specification in the presence of two subscribing witnesses.

JOHN BRITON KIMBELL.

Witnesses:
  J. A. DODGEN,
  P. T. CRISLER.